March 16, 1971 YOSHIAKI TOMINAGA 3,570,321
HANDLE LEVER FITTING DEVICE FOR MOTOR DRIVEN VEHICLES
Filed March 21, 1969
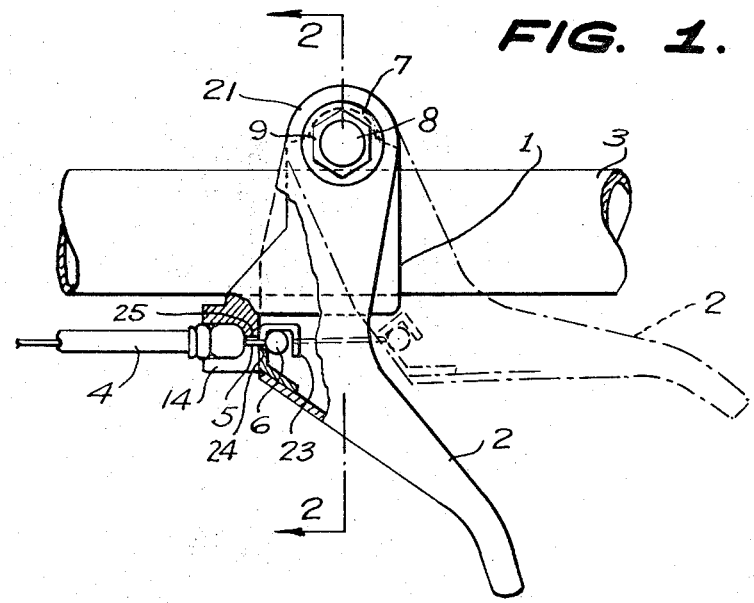
FIG. 1.
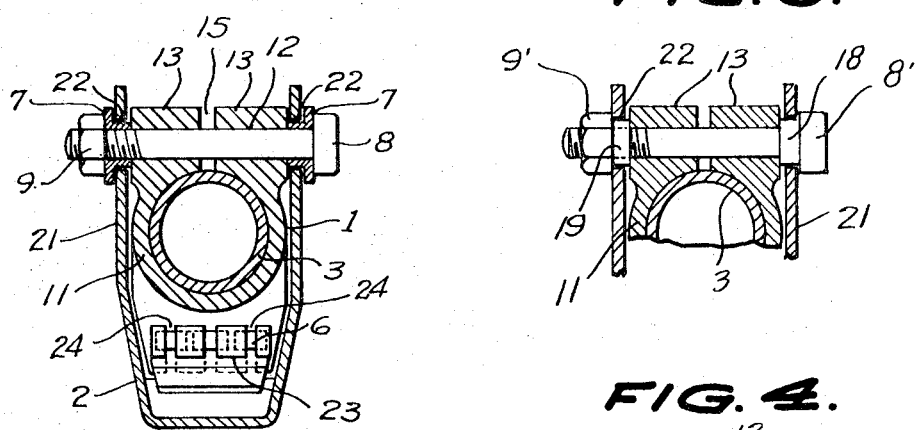
FIG. 2.
FIG. 3.
FIG. 4.
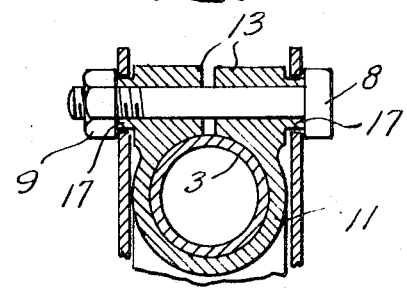
INVENTOR.
YOSHIAKI TOMINAGA,
BY
Berman, Davidson & Berman,
ATTORNEYS.

United States Patent Office 3,570,321
Patented Mar. 16, 1971

3,570,321
HANDLE LEVER FITTING DEVICE FOR
MOTOR DRIVEN VEHICLES
Yoshiaki Tominaga, Hamakita-shi, Japan, assignor to
Yamaha Hatsudoki Kabushiki Kaisha, Hamakita-shi,
Japan
Filed Mar. 21, 1969, Ser. No. 809,310
Claims priority, application Japan, Mar. 27, 1968,
43/24,197
Int. Cl. G05g 11/00
U.S. Cl. 74—489                           7 Claims

ABSTRACT OF THE DISCLOSURE

A hand lever fitting including a bifurcated ring clamp for clasping a handlebar, locking extensions on said clamp so positioned as to engage one side of the handlebar and a socket positioned on the clamp to receive the housing tube of a control cable at the opposite side of the handlebar, a hand lever having spaced arms which straddle the locking extensions of the ring clamp, a hook member secured to the lever and resting against said socket, passage means through said socket for passing a control cable whose end is to be grasped by said hook member, aligned apertures in said clamp locking extensions and lever arms, and bolt-like securing means passing through said aligned apertures for tightening the ring clamp about the handlebar while permitting rotation of the lever with respect to the clamp to move the control cable, said securing means serving as a single means to enable installation of the hand lever and the ring clamp as a unit in any desired position and at any desired angle on a handlebar of a motorcycle, snowmobile, or the like.

---

This invention relates to a brake, throttle, or similar lever, hereinafter simply termed a hand lever, to be installed on a handlebar of a motorcycle, snowmobile, or similar vehicle, and more particularly to a hand lever fitting device having a single securing means which enables the installation of a hand lever and its holder as a unit in any position on or at any angle on a handlebar.

In known conventional fittings of this type, a hand lever is mounted with a bolt and a nut on a lever holder which is already secured by other means on the handlebar at a fixed angle and position.

A primary object of the invention is to simplify conventional lever fittings and to provide a device which will secure the hand lever and lever holder simultaneously by a single securing means, preferably a bolt and a nut, thus, enabling users to easily change the position or the angle of the lever simply by unthreading and rethreading the bolt and nut.

Another important object of the invention is to provide a hand lever fitting device, having the above-mentioned characteristics, wherein the device is constructed in a compact way allowing the lever to have a long stroke.

A further important object of this invention is to provide a hand lever fitting device, having the above-mentioned characteristics, wherein the hand lever is held on the top and bottom of the lever holder enabling easy installation of a plurality of control cables in a vertical plane at the side of a handlebar.

Still another object of the invention is to provide a hand lever fitting, having the above-described characteristics, which is of simple construction, easy and economical to fabricate, and easy to install.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawing, wherein like reference characters indicate like parts throughout the several figures, and in which:

FIG. 1 is a plan view of a hand lever fitting device in accordance with this invention, partially broken away to reveal inner details, an operative position of the lever when pulled being shown in dot and dash lines;

FIG. 2 is a cross-sectional view taken on line 2—2 of FIG. 1; and

FIGS. 3 and 4 are views similar to FIG. 2, but showing modified embodiments.

Referring now more particularly to the drawing, the invention comprises a hand lever 2 and a lever holder 1 adapted to mount the entire assembly, or fitting, on a handlebar 3. The lever holder 1 may conveniently be formed as an aluminum die casting to include a bifurcated split ring clamp 11, a pair of locking extensions 13, separated by the slit, or bifurcation 15, and a socket portion 14. The locking extensions 13 may be of any suitable form, but preferably have plane surfaces at their exteriors, parallel to the walls of the slit 15, and each extension is pierced by an opening 12 to receive the locking bolt 8. Preferably, the locking extensions are disposed in such position as to fall on one side of the handlebar 3 or ring clamp 11, while the socket 14 is positioned diametrically opposite the extensions so as to locate on the opposite side of the handlebar. The socket 14 seats and secures the end of a tubular housing 4 for the control cable 5. One or more sockets 14 may be formed on the ring clamp for purposes to be hereinafter explained, and in the illustrated embodiment of FIGS. 1 and 2, two additional sockets are provided, which are not visible in FIG. 1, being aligned in a vertical plane under the top socket.

The hand lever 2 comprises a channel-shaped handle which may conveniently be formed of pressed sheet metal and having integrally formed with the sides thereof a pair of spaced arms 21 at one end extending away from the handle at an angle slightly greater than a right angle. Arms 21 straddle the locking extensions 13 of the ring clamp and are provided with aligned openings 22 which are coaxial with the openings 12 in the locking extensions 13. The openings 22 are of larger diameter than the openings 12 and are intended to receive spacer collars 7 between the head of bolt 8 and the outer plane surface of the adjacent locking extension 13 and correspondingly between nut 9 and its adjacent locking extension 13. In addition to their spacing function, collars 7 form bearings for rotation of the arms 21 and the rigidly attached handle 2. The collars may be formed of metal or plastic, such as ethylene tetrafluoride known under the trade name as Teflon. A hook member 23 is secured to the inner surface of the handle 2 at one end thereof and between the spaced arms 21. Hook 23 is preferably of inverted U-shape in cross-section, the left side of which, as viewed in FIG. 1, bears against the socket 14 of the ring clamp and acts as a stop for the handle 2 against further leftward movement. This arm is extended downwardly and to the right to form a supporting surface for the hook, which may be welded, soldered, or otherwise affixed to the handle 2. The other side of the U-portion of the hook member 23 is slotted at 24, the slot extending completely through the base of the U and partly along the first side of the U. Three slots 24 are shown in FIG. 2, the hook member being adapted to receive and hold pin-like end members 6 terminating the control wires 5. The pins 6 are secured to the wires 5 so as to extend transversely thereof. If desired, balls, or other types of detents may be used. Thus, a plurality of control cables 5 may be attached to the hand lever so that the control cables may be simultaneously operated to regulate, for example, injection of an oil pump supplying the engine of the vehicle with oil and the throttles of two carburetors, when the vehicle is equipped with a 2-cycle twin cylinder engine. Each socket 14 is provided with a conduit passage 25 which passes the control cable 5 into the corresponding slot 24 of the hook member.

To install the device as described, the ring clamp 11 is slid onto the handlebar 3 to a desired position thereon, and the cable housings secured in sockets 14 with the cables threaded therethrough. Arms 21 of the hand lever 2 are then placed about the holder 1 while the terminations 6 of the control cables are pulled to the right, as viewed in FIG. 1, a sufficient distance to slip the control cables 5 through the slots 24 in the hook member 23. The terminations may then be released to ride into the U-shaped portions of the hook as illustrated in FIGS. 1 and 2. The collars 7 are then placed in the openings 22 of the lever arms and aligned coaxially with the openings 12 in the locking extensions of the holder 1. The bolt 8 is then inserted through the aligned openings of the collars 7, the locking extensions 13, and the arms 21. When the nut 9 is threaded on the end of the bolt the nut and bolt head engage the collars which, in turn, engage the locking extensions 13 so that the bifurcation 15 is reduced in width and the ring clamp 11 is tightened into holding condition on the handlebar. Thus, the tightening of one securing means, i.e., the bolt and nut, serves to clamp the entire assembly on the handlebar in its desired position while the lever handle 2 is free to rotate about the bolt as an axis.

As thus assembled and installed, the fitting is ready for use, and an operator needs merely to move the handle 2 toward the handlebar to any desired degree, or to the maximum extent shown in the broken lines in FIG. 1, and hold the handle in such desired position, with the result that the hook member 23 pulls the control cables 5, regulating the carburetors and pump by such movement.

A user may easily change the position of the device along the handlebar, or change its angle of mounting, by merely loosening the nut 9 on bolt 8 and sliding the ring clamp 11 to any desired position and angle. The nut is then rethreaded, or tightened, on the bolt, clamping the device in its new position.

In FIG. 3 is illustrated a modified embodiment which differs from the embodiment of FIGS. 1 and 2 only in the following respects. The spacer collars 7 are omitted and the bolt and nut are replaced by a step bolt 8' and a step nut 9'. The head of the bolt is provided with a reduced diameter portion 18 which acts as a spacer between the locking extension 13 and the head of the bolt to permit rotation of the arm 21. Similarly, the nut 9' is provided with a reduced diameter portion 19 which seats in the opening 22 of the other arm 21 of the lever and acts as a spacer and a bearing therefor.

In FIG. 4 is shown still another embodiment of the invention which differs from the FIG. 1 embodiment only in the following respects. Again, the collars 7 are omitted, and in place thereof the locking extensions 13 of the ring clamp are provided with integral, outwardly extending bosses 17 which are pierced by the openings 12 and which act as spacers for the bolt and nut and bearings for the lever arms.

It will be obvious that the modified embodiments of FIGS. 3 and 4 may be installed in the same manner as described above for the embodiment of FIG. 1, except that the installation is simpler by reason of the omission of the separate collars 7. Operation of the modified embodiments is the same as described for the FIG. 1 embodiment.

Although certain specific embodiments of this invention have been illustrated and described, it is obvious that many modifications thereof are possible. This invention, therefore, is not intended to be restricted to the exact showing of the drawing and description thereof, but is considered to include reasonable and obvious equivalents.

The embodiments of the invention in which an exclusive property or privilege is claimed are defined as follows:

1. A hand lever fitting for motorcycles, snowmobiles, and the like, comprising a split ring clamp adapted to receive a handlebar and having a pair of thickened locking extensions each extending perpendicularly away from the split a distance approximately equal to the radius of the ring clamp, a socket on said ring clamp disposed opposite to said extensions and adapted to seat the tubular housing of a control cable, a hand lever having a pair of spaced arms straddling said locking extensions and said ring clamp, a hook member secured to said hand lever and adapted to rest against said socket and grasp the end of a control wire, passage means between said socket and hook member for passing a control wire from the interior of said socket to said hook member, a first pair of aligned openings in said locking extensions, a second pair of aligned openings in said lever arms, and a single securing means passing through said first and second pairs of aligned openings to tighten said ring clamp and locking extensions about a handlebar while mounting the hand lever for free rotation with respect to the ring clamp.

2. A hand lever fitting according to claim 1, wherein said securing means comprises a headed bolt having a shank passing through said aligned openings, and a nut threaded on said shank.

3. A hand lever fitting according to claim 2, wherein is additionally provided a pair of spacer collars inserted in said openings in the arms of the hand lever and about the bolt shank, said collars spacing the bolt head and nut from said locking extensions and permitting free rotation of the hand lever.

4. A hand lever fitting according to claim 3, wherein said collars are integrally formed as parts of said locking extensions of the ring clamp.

5. A hand lever fitting according to claim 1, wherein said securing means comprises a step bolt having a head with a reduced diameter portion fitting into the opening of one of said arms of the hand lever, and a step nut threaded on said bolt and having a reduced diameter portion fitting into the opening of the other of said arms of the hand lever.

6. A hand lever fitting according to claim 1, wherein a plurality of sockets are formed on said ring clamp, each of said sockets being adapted to seat and secure the tubular housing of a separate control cable, and said hook member being formed to grasp the terminations of a plurality of cables.

7. A hand lever fitting for motorcycles, snowmobiles, and the like, comprising a bifurcated ring clamp having a pair of locking extensions adjacent the bifurcation, a socket on said clamp opposite said extensions and adapted to seat the tubular housing of a control cable, a hand lever having a pair of spaced arms straddling said locking extensions of the ring clamp, a hook member secured to said hand lever and adapted to rest against said socket and grasp the end of a control wire, passage means between said socket and hook member for passing a control wire from the interior of said socket to said hook member, aligned openings in said locking extensions and lever arms, and securing means including a headed bolt having a shank passing through said aligned openings, a nut threaded on said shank to tighten said ring clamp and locking extensions about a handlebar while mounting the hand lever for free rotation with respect to the ring clamp, and a pair of spacer collars including ring-like flanges at their outer ends which bear against the said nut and head of the bolt inserted in said openings in the arms of the hand lever and about the bolt shank, said collars spacing the bolt head and nut from said locking extensions and permitting free rotation of the hand lever.

References Cited

UNITED STATES PATENTS

| | | | |
|---|---|---|---|
| 952,349 | 3/1910 | Péducasse | 74—489 |
| 1,319,627 | 10/1919 | Sentinella | 74—489 |
| 2,905,017 | 9/1959 | Randolph | 74—489 |
| 3,176,536 | 4/1965 | Altenburger | 74—489 |

FOREIGN PATENTS

| | | | |
|---|---|---|---|
| 659,145 | 10/1951 | Great Britain | 74—489 |
| 897,660 | 11/1953 | Germany | 74—489 |
| 666,334 | 5/1929 | France | 74—489 |

FRED C. MATTERN, Jr., Primary Examiner

R. HEALD, Assistant Examiner